(12) United States Patent
Robertson et al.

(10) Patent No.: US 9,209,441 B2
(45) Date of Patent: Dec. 8, 2015

(54) METHOD FOR SPLIT WIRE ROUTING IN A CAVITY FOR A DEVICE

(71) Applicant: Nook Digital, LLC, New York, NY (US)

(72) Inventors: Karla Robertson, Woodside, CA (US); Nina Joshi, Saratoga, CA (US)

(73) Assignee: NOOK DIGITAL, LLC, New York, NY (US)

( * ) Notice: Subject to any disclaimer, the term of this patent is extended or adjusted under 35 U.S.C. 154(b) by 79 days.

(21) Appl. No.: 13/749,273

(22) Filed: Jan. 24, 2013

(65) Prior Publication Data

US 2014/0201997 A1     Jul. 24, 2014

(51) Int. Cl.
*H01M 2/10*     (2006.01)

(52) U.S. Cl.
CPC ........ *H01M 2/1016* (2013.01); *Y10T 29/49002* (2015.01); *Y10T 29/49169* (2015.01)

(58) Field of Classification Search
CPC ....... H01M 2/20; H01M 2/202; H01M 2/204; H01M 2/22; H01M 2/24; H01M 2/1061; H01M 2/1066; Y10T 29/49002; Y10T 29/49169
USPC ................................. 429/159, 160
See application file for complete search history.

(56) References Cited

U.S. PATENT DOCUMENTS

| | | | |
|---|---|---|---|
| 3,659,319 A | 5/1972 | Erickson | |
| 3,836,415 A | 9/1974 | Hilderbrandt | |
| 5,601,942 A * | 2/1997 | Fedele | 429/159 |
| 5,825,635 A | 10/1998 | Mukoyama et al. | |
| 6,160,702 A | 12/2000 | Lee et al. | |
| 6,259,019 B1 | 7/2001 | Damilo | |
| 6,844,105 B1 | 1/2005 | Hanafusa et al. | |
| 7,304,861 B2 | 12/2007 | Takahashi | |
| 8,017,264 B2 | 9/2011 | Hong et al. | |
| 8,025,997 B2 | 9/2011 | Kim | |
| 2002/0109971 A1 | 8/2002 | Gilley | |
| 2005/0069763 A1 | 3/2005 | Hong | |
| 2005/0079412 A1 | 4/2005 | Kim | |
| 2006/0166086 A1 | 7/2006 | Kato | |
| 2008/0081249 A1 | 4/2008 | Kaneko | |
| 2008/0113262 A1 | 5/2008 | Phillips et al. | |
| 2012/0009443 A1 | 1/2012 | Baek et al. | |
| 2012/0231320 A1 | 9/2012 | Heck et al. | |

(Continued)

OTHER PUBLICATIONS

"Refilling laptop batteries With Some Tricks", dated Apr. 11, 2012, http://www.brand-new-battery.com/blog/articles/refilling-laptop-batteries-with-some-tricks.htm.*

(Continued)

*Primary Examiner* — Livius R Cazan
(74) *Attorney, Agent, or Firm* — Finch & Maloney PLLC

(57) ABSTRACT

Techniques for efficient routing of wires and electrical components within a cavity of a device are disclosed. A wire or group of wires can be routed in a split wire configuration, for example, in the space between two battery cells (or other components/structures). One example embodiment includes exposing a cavity between at least two electrical parts within an electrical device, and routing a first electrical component through the cavity and routing a second electrical component in a divergent path to the first electrical component, wherein the first and second electrical component have a common start and end point. In some cases, the first and second electrical components are wires. Numerous such split wire configurations will be apparent in light of this disclosure.

9 Claims, 5 Drawing Sheets

(56) References Cited

U.S. PATENT DOCUMENTS

| | | | |
|---|---|---|---|
| 2012/0270074 A1* | 10/2012 | Koh | 429/7 |
| 2012/0308849 A1 | 12/2012 | Tortstensson et al. | |
| 2014/0026411 A1 | 1/2014 | Robertson et al. | |
| 2014/0027166 A1 | 1/2014 | Robertson et al. | |
| 2014/0029218 A1 | 1/2014 | Robertson et al. | |
| 2014/0201996 A1 | 7/2014 | Robertson et al. | |
| 2014/0204547 A1 | 7/2014 | Robertson et al. | |

OTHER PUBLICATIONS

Printout of "refilling" images, document created by the examiner on Mar. 24, 2015.*

D1, based on http://www.etotheipiplusone.net/?p=1020, Oct. 10, 2010.*

D2, based on http://www.etotheipiplusone.net/?p=1521, Aug. 19, 2011.*

Robertson, et al., U.S. Appl. No. 13/749,264, filed Jan. 24, 2013, entitled, "Apparatus for Split Wire Routing in a Bracket for a Device."

Robertson, et al., U.S. Appl. No. 13/749,257, filed Jan. 24, 2013, entitled, "Techniques for Split Wire Routing for a Bracket in a Device."

Non Final Office Action issued for U.S. Appl. No. 13/749,257. Mail date: Dec. 4, 2014, 19 pages.

Non-Final Office Action issued on U.S. Appl. No. 13/749,264. Mailed on Dec. 29, 2014. 23 pages.

Non-Final Office Action issued on U.S. Appl. No. 13/656,309. Mailed on Jan. 2, 2015. 22 pages.

Robertson, et al., U.S. Appl. No. 13/656,309, filed Oct. 19, 2012, entitled, "Techniques for Efficient Wire Routing in a Device,". Corresponding U.S. Publication No. 2014/0026411 cited above.

Robertson, et al., U.S. Appl. No. 13/946,545, filed Jul. 19, 2012, entitled, "Techniques for Efficient Wire Routing in Electronic Devices,". Corresponding U.S. Publication No. 2014/0027166 cited above.

Robertson, et al., U.S. Appl. No. 13/656,364, filed Oct. 19, 2012, entitled, "Apparatus for Efficient Wire Routing in a Device,". Corresponding U.S. Publication No. 2014/0029218 cited above.

Robertson, et al., U.S. Appl. No. 13/749,257, filed Jan. 24, 2013, entitled, "Techniques for Split Wire Routing for a Bracket in a Device,". Corresponding U.S. Publication No. 2014/0201996 cited above.

Robertson, et al., U.S. Appl. No. 13/749,264, filed Jan. 24, 2013, entitled, "Apparatus for Split Wire Routing in a Bracket for a Device,". Corresponding U.S. Publication No. 2014/0204547 cited above.

* cited by examiner

Each line indicates multiple wires all taking the same path
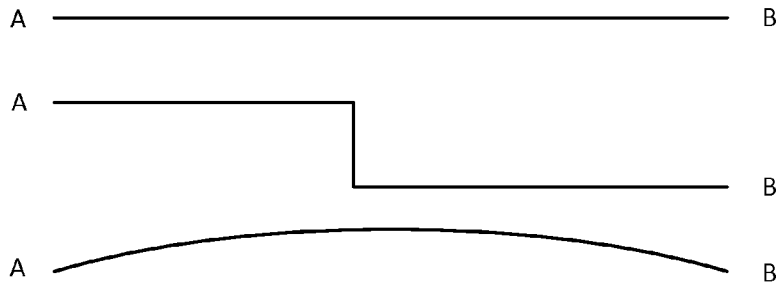
Fig. 2
(Prior Art)
Split Wire Routing: Each line indicates multiple wires or a single wire taking divergent paths with the same start and end points
Two  Fig. 4
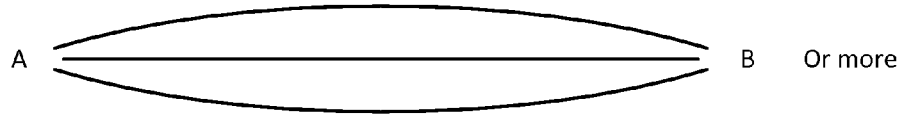
Or more  Fig. 5
Each group can have a different length  Fig. 6

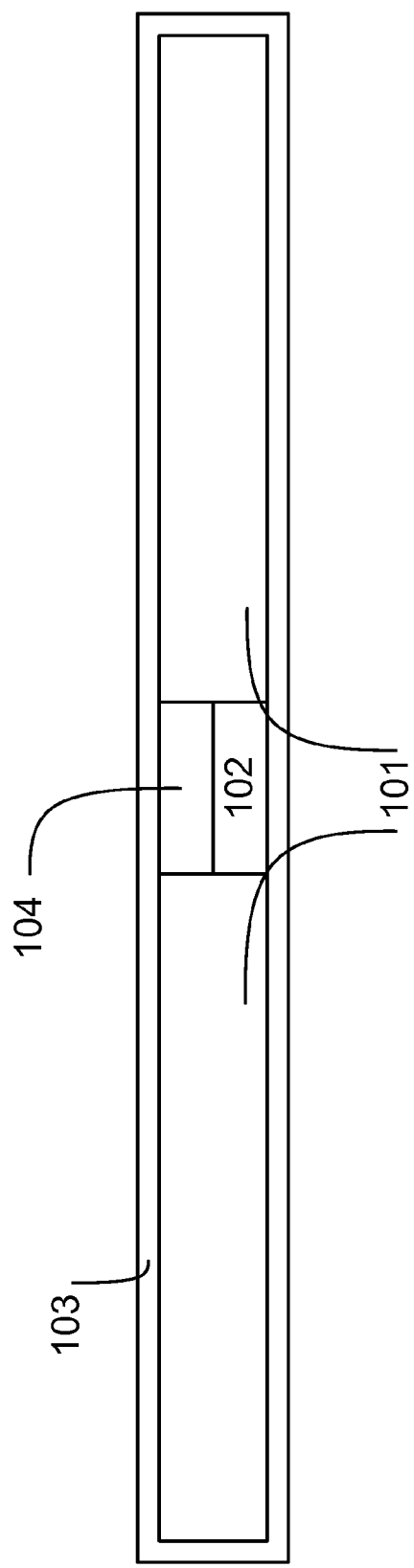

METHOD FOR SPLIT WIRE ROUTING IN A CAVITY FOR A DEVICE

RELATED APPLICATIONS

This application is related to U.S. application Ser. No. 13/656,309, filed Oct. 19, 2012, published on Jan. 30, 2014 as U.S. Pre-Grant Publication No. 2014/0026411, and titled "Techniques for Efficient Wire Routing in a Device". This application is herein incorporated by reference in its entirety.

This application is related to U.S. application Ser. No. 13/656,364 filed Oct. 19, 2012, published on Jan. 30, 2014 as U.S. Pre-Grant Publication No. 2014/0029218, and titled "Apparatus for Efficient Wire Routing in a Device" which is herein incorporated by reference in its entirety.

This application is related to U.S. Application No. 61/675,122, filed Jul. 24, 2012, and titled "Apparatus for Efficient Wire Routing in a Device" which is herein incorporated by reference in its entirety.

This application is related to U.S. Application No. 61/675,131 filed Jul. 24, 2012 and titled "Apparatus for Efficient Wire Routing in a Device" which is herein incorporated by reference in its entirety.

This application is related to U.S. Application No. 61/675,136, filed Jul. 24, 2012, and titled "Method for Efficient Wire Routing in a Device" which is herein incorporated by reference in its entirety.

This application is related to U.S. Application No. 61/675,140 filed Jul. 24, 2012 and tided "Method for Efficient Wire Routing in a Device" which is herein incorporated by reference in its entirety.

FIELD OF THE DISCLOSURE

The present disclosure relates to electrical wire routing, and more specifically to routing wires within compact electrical devices.

BACKGROUND

Typical electronic devices include a number of components populated on a printed circuit board (PCB) that has conductive runs electrically coupling various point of the circuitry. In some cases, additional wires are routed above the PCB to couple other points of the circuitry, such as those points that are not in direct contact with a contact pad of the PCB. Efficiently routing wires and other electrical elements within compact devices involves a number of non-trivial challenges.

One example of challenge of routing wires is depicted in FIG. 1. As can be seen, the example system does not allow for all the wires to be routed together due to space constraints on either side of an obstacle. In particular, the group of wires 105 is blocked by a component 103. Consequently, the group of wires would require rerouting around the component. Present solutions for wire routing between two points A and B are depicted in FIG. 2 that require the multiple wires to use the same path.

SUMMARY

An embodiment of the present invention includes an electrical device. In this example embodiment, the device includes a printed circuit board (PCB), at least two battery cells in contact with the PCB, and a cavity with three or more boundaries comprising at least the PCB and one edge of each of the two battery cells. The device further includes a cavity that is formed by a method later described in FIG. 3 to facilitate a split wire routing configuration depicted in connection with FIGS. 4-6. In some cases, the device further includes an insulating tape covering a substantial portion of the at least two battery cells. In some cases, the at least two battery cells are package in the insulating tape, and the insulating tape is breached to expose the cavity.

Another embodiment of the present invention includes a split wire routing in a cavity for routing a plurality of wires in a group or a single wire in a group. This allows for each group to have the same start and end point but take divergent paths. Several embodiments of the novel wire routing are depicted in connection with FIGS. 4-6. In one embodiment, each line 1002 in the FIGS. 4-6 represents a single wire. In another embodiment, each line 1002 in the FIGS. 4-6 represents a group of wires. As discussed previously, each embodiment allows each represent wire or group of wires (1002) to have the same start and end point that are represented by A and B, respectively.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 depicts prior art solutions to the limitation depicted in FIG. 1.

FIG. 3A shows a cross-sectional view of a circuit having two battery cells enclosed in an electrical tape.

FIGS. 4-6 represent split wire routing, in accordance with multiple embodiments of the present invention.

DETAILED DESCRIPTION

Techniques for efficient routing of wires and electrical components within a device are disclosed. Electrical devices may have an insulating tape or coating surrounding all or a portion of the device. This tape may isolate cavities within the device that may be underutilized. For example, a Mylar® tape may cover two or more battery cells where there is an unused cavity between each of the cells. The electrically insulating tape surrounding the battery (or other component) may be cut in order to expose the cavity between distinct battery cells (or other components).

General Overview

As previously explained, efficiently routing wires and other electrical elements within compact devices involves a number of non-trivial challenges. For instance, electronic devices are present in various form factors, such as, tablets, cell phones, laptops, e-book readers, etc. One solution for routing wires or electrical components within an electrical device is to increase the gap between two electrical parts within the device so as to route the wire between the two parts. Unfortunately, this results in an increase in at least one dimension of the device footprint. FIG. 3A shows a cross-sectional view of two battery cells 101 with a printed circuit board (PCB) 102 between the battery cells, all surrounded by a Mylar® or other electrically insulating tape 103. The electrical insulating tape 103 coating battery cells 101 and PCB 102 may leave an unused cavity 104 between the battery cells.

Thus, and in accordance with an embodiment of the present invention, techniques are disclosed for more effectively routing wires and other electrical components through electronic devices by exploiting underutilized space. According to one embodiment, the Mylar® tape surrounding battery cells may be removed or otherwise temporarily opened so as to expose the unused cavity between distinct battery cells. Note that embodiments other than wire routing between cells of a battery can also benefit from the techniques provided herein, as will be appreciated in light of this disclosure.

Methodology

Figure 1:
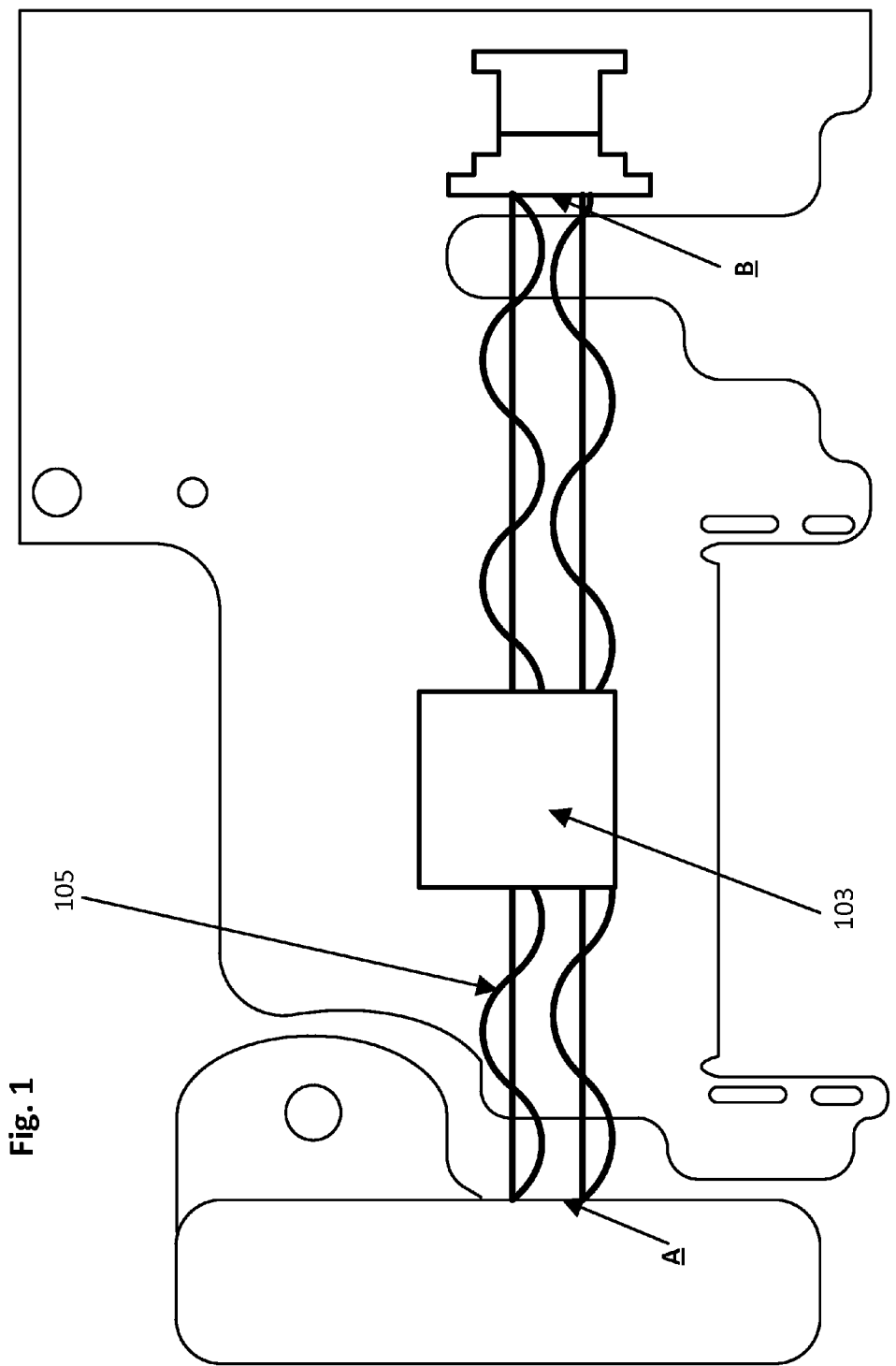
FIG. 1 depicts a limitation of the prior art.
Figure 3B:
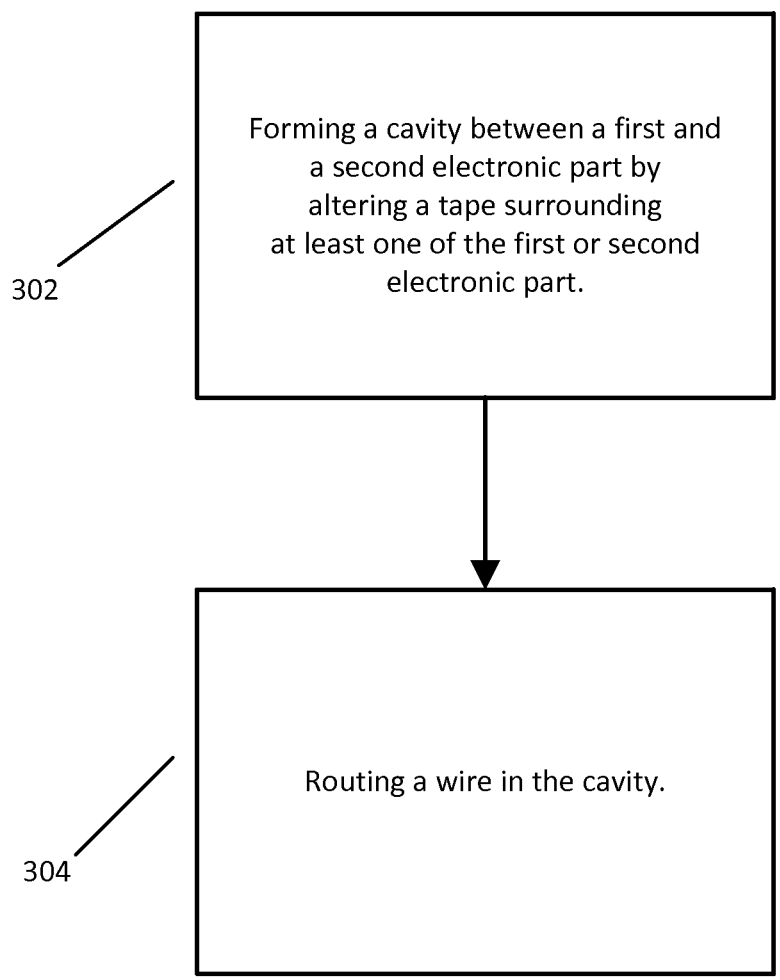
FIG. 3B depicts a method of forming a cavity in accordance with an embodiment of the present invention.

FIG. 3B is a method in accordance with one embodiment of the claimed subject matter. In a first step 302, the method of this example case includes forming a cavity between a first and a second electronic part by altering a tape surrounding at least one of the first or second electronic part. In the next step 304, the method includes routing a wire in the cavity that was formed.

Figure 7:
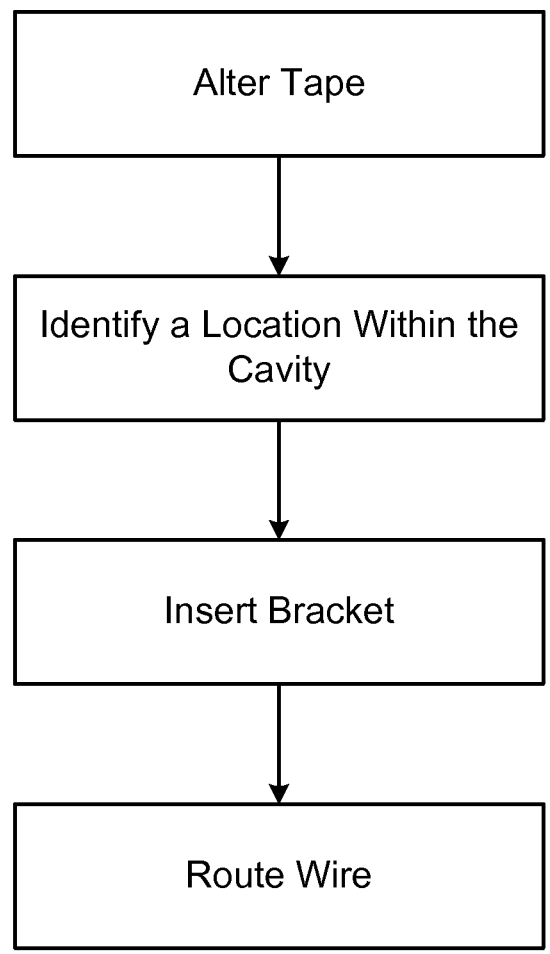
FIG. 7 shows a method for routing a wire in an electrical device, in accordance with one embodiment of the present invention.

FIG. 7 illustrates a method for routing a wire within a cavity in an electrical device, according to one embodiment of the present invention. Initially, the electrical device may be entirely or substantially covered in an electrical insulating tape. In some embodiments this tape is made of Mylar®, or some other suitable insulating material. In order to access the underutilized cavities within the electrical device, the tape layer can be altered or cut. In an example embodiment, the tape is cut above the unused cavity between two battery cells in order to access the cavity for which a wire will be routed.

Split Wire Routing within Cavity

In one embodiment, each line 1002 in the FIGS. 4-6 represents a single wire. In another embodiment, each line 1002 in the FIGS. 4-6 represents a group of wires. As discussed previously, each embodiment allows each represent wire or group of wires (1002 and 1004) to have the same start and end point that are represented by A and B, respectively. In yet another embodiment, the line 1002 is routed through a cavity depicted in previous figures while allowing line 1004 to be routed without utilizing the cavity, but have the same start and end point that are represented by A and B.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of routing a first and a second wire, comprising:

installing at least two battery cells within an electrical device, wherein the battery cells are packaged together such that the battery cells are included in the same package, wherein a gap between two of the battery cells defines a cavity within the package;

exposing the cavity between the two battery cells by altering the package;

inserting at least one bracket within the cavity so as to bridge the gap between the two battery cells;

routing a first electrical wire through the cavity and the at least one bracket; and routing a second electrical wire in a divergent path to the first electrical wire, the divergent path being external to the cavity, wherein the first and second electrical wires have a common start point external to the cavity and a common end point external to the cavity, the common start point being different than the common end point.

2. The method of claim 1, wherein exposing the cavity comprises altering an insulating tape that is covering a substantial portion of the cavity.

3. The method of claim 1, wherein the at least two battery cells are separated by a printed circuit board (PCB).

4. The method of claim 1, wherein the package is formed in part by insulating tape at least one wire through the cavity.

5. The method of claim 1, wherein the at least two battery cells are prepackaged within insulating tape.

6. A method for routing an electrical component, comprising:

exposing a cavity between at least two battery cells within an electrical device, wherein the battery cells are packaged together such that the battery cells are included in the same package, wherein a gap between two of the battery cells defines the cavity within the package;

inserting at least one bracket within the cavity so as to bridge the gap between the two battery cells; and routing a first electrical component through the cavity and the at least one bracket; and routing a second electrical component in a divergent path to the first electrical component, the divergent path being external to the cavity, wherein the routing is a split wire configuration, and wherein the first and second electrical components have a common start point external to the cavity and a common end point external to the cavity, the common start point being different than the common end point.

7. The method of claim 6, wherein exposing a cavity comprises altering an insulating tape that is covering at least a portion of the cavity.

8. The method of claim 6, wherein the two battery cells are by a printed circuit board (PCB).

9. The method of claim 6, wherein routing the first electrical component through the cavity comprises routing at least one wire through the cavity.

* * * * *